Jan. 6, 1953 H. C. KAPLAN 2,624,478
SELF-LOADING VEHICLE AND CONTROLS THEREFOR
Filed Feb. 9, 1950 4 Sheets-Sheet 1

INVENTOR.
Hyman C. Kaplan
BY
Atty.

Jan. 6, 1953 H. C. KAPLAN 2,624,478
SELF-LOADING VEHICLE AND CONTROLS THEREFOR
Filed Feb. 9, 1950 4 Sheets-Sheet 2

INVENTOR.
Hyman C. Kaplan
BY
Maurice S. Cayne
Atty.

Jan. 6, 1953          H. C. KAPLAN          2,624,478
SELF-LOADING VEHICLE AND CONTROLS THEREFOR
Filed Feb. 9, 1950          4 Sheets-Sheet 3
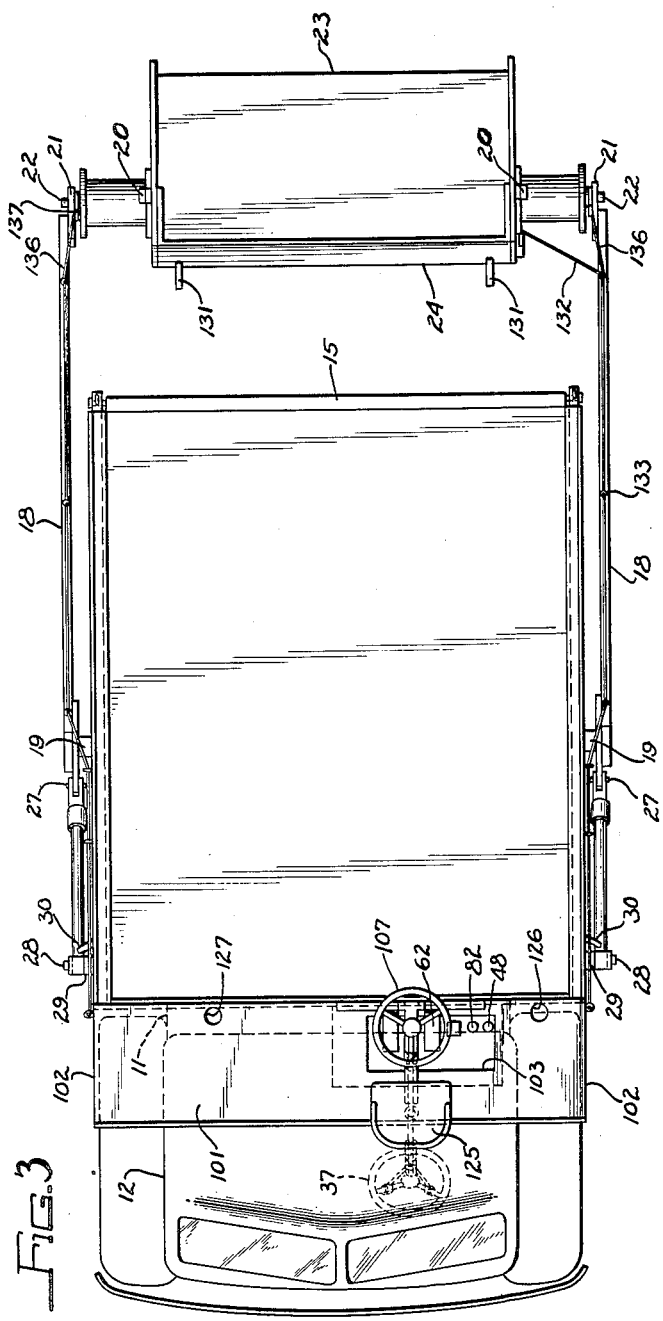
INVENTOR.
Hyman C. Kaplan
BY
Maurice E. Bayne
Atty.

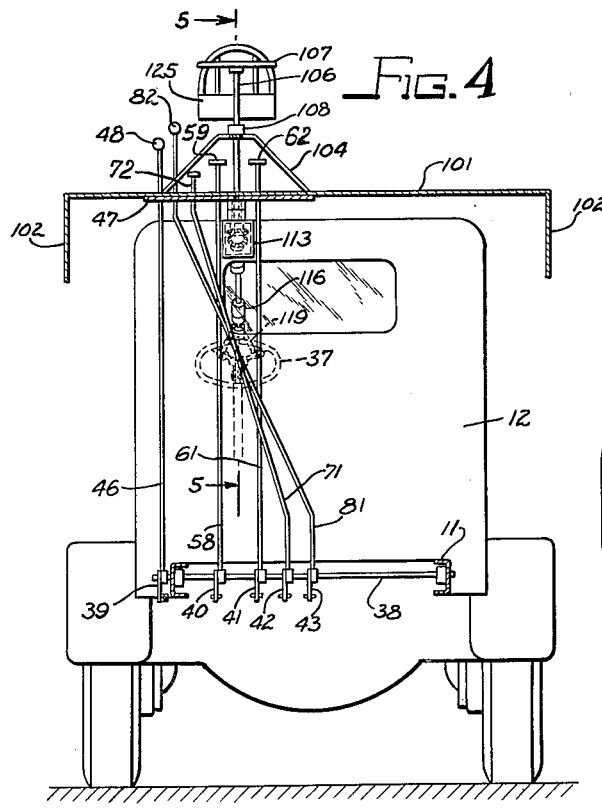
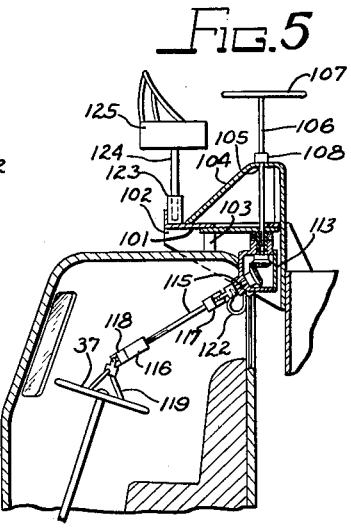
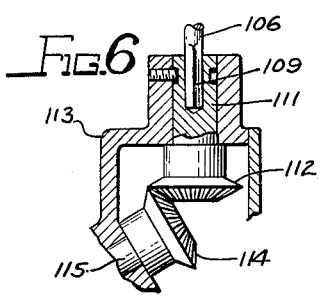
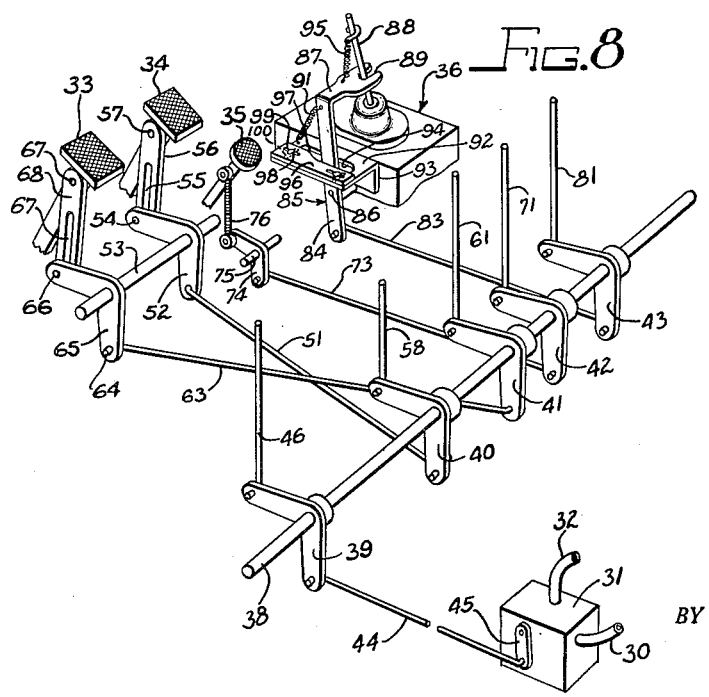
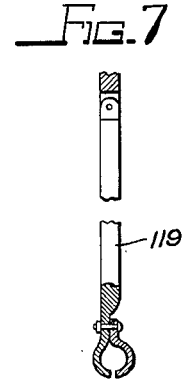
INVENTOR.
Hyman C. Kaplan

Patented Jan. 6, 1953

2,624,478

UNITED STATES PATENT OFFICE 2,624,478

SELF-LOADING VEHICLE AND CONTROLS THEREFOR

Hyman C. Kaplan, Chicago, Ill., assignor, by mesne assignments, to Efficient Equipment, Inc., Chicago, Ill., a corporation of Illinois Application February 9, 1950, Serial No. 143,319

8 Claims. (Cl. 214—78)

This application is a continuation in part of application Serial No. 758,366 filed July 1, 1947 and now abandoned.

The invention relates to improvements in self-loading vehicles and more particularly to a vehicle of that character having auxiliary vehicle and lift controls located above the plane of the vehicle cab roof for manipulation by an operator facing to the rear of the vehicle.

The construction of self-loading vehicles of the kind including lift means located at the rear of the vehicle body usually requires that the operator operate the vehicle and lift control means, during a loading operation, while standing on the vehicle running board or to otherwise so position himself with respect to the conventional vehicle and lift controls as to obtain but a partial view of the area immediately in the rear of the vehicle body. Obviously, the operator is at a serious disadvantage because of the difficulty encountered in moving the vehicle into various positions necessary to engage the lift or shovel with material to be loaded and to then operate the lift and discharge its contents into the vehicle body. It is, therefore, an object of the present invention to provide a self-loading vehicle with novel auxiliary controls located in a position to facilitate efficient operation and full observation of the loading area without discomfort to the operator.

Because the self-loading vehicle embodying the features of the present invention must be capable of being operated in a normal manner from within the vehicle cab, such auxiliary controls as are provided must necessarily be of a kind that will not interfere with or otherwise impair normal operation. It is, therefore, an object of the invention to provide a self-loading vehicle with novelly constructed permanently installed auxiliary vehicle control means of a kind that will not impair normal operation of the vehicle.

Another object is to provide lift means which consists of arms pivotally mounted at one of their ends and suitably formed at their other ends to detachably engage securely independent material containers.

Another object of the invention is to provide, as a permanent installation, novelly constructed auxiliary controls for the vehicle controls.

Another object is to provide lift control means and auxiliary vehicle control means in the region of the roof of a vehicle cab so positioned as to be manipulable by an operator seated over said roof and facing to the rear of the vehicle.

Another object is to provide an auxiliary control mechanism for a self-loading vehicle which is not expensive to construct or to install but which is highly efficient in operation and in use and is durably constructed.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Fig. 3 is a plan view of the vehicle.

Fig. 4 is an elevational view of the rear of the vehicle cab, taken substantially on line 4—4 of Fig. 1 and showing the chassis in section.

Fig. 5 is a longitudinal sectional view of the top portion of the cab and related portion of the body, taken substantially along line 5—5 of Fig. 4, illustrating parts of the auxiliary steering mechanism and the operator's seat in elevation.

Fig. 6 is a fragmentary detail view of the auxiliary steering post mounting.

Fig. 7 is a detail view of one of the arms for engaging the steering wheel.

Fig. 8 is a schematic perspective view of the auxiliary control linkage illustrating its connection to the conventional vehicle controls.

Fig. 9 is a sectional detail view of the adjustable auxiliary control for the gear shift.

Fig. 10 is an end elevational view of a modified form of a loading container.

Figure 1:
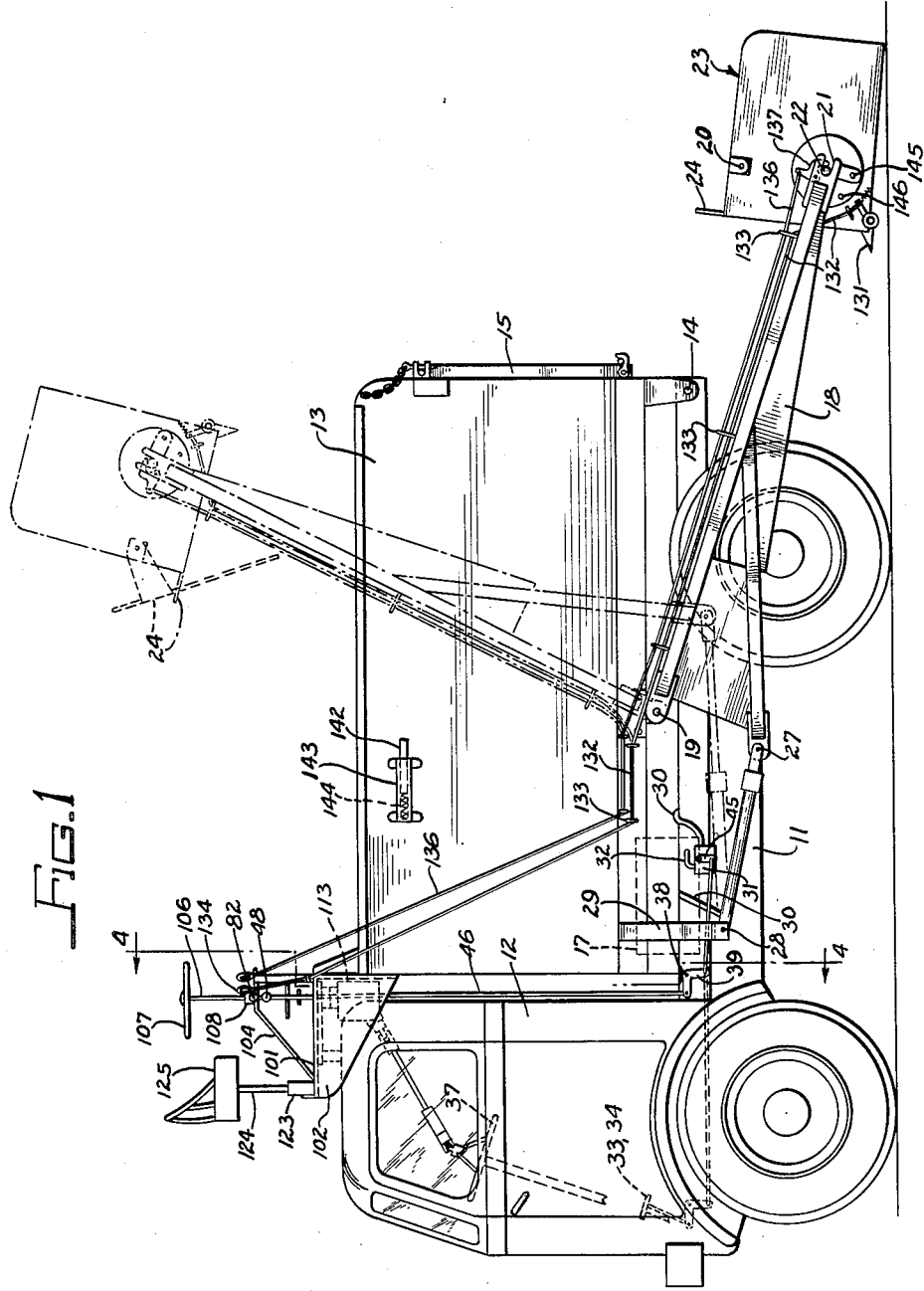
Fig. 1 is a side elevational view of a self-loading vehicle embodying the features of the present invention.

Upon referring to the accompanying drawings, the invention is shown embodied in the construction of a conventional dump truck. Upon referring particularly to Figs. 1, 2 and 3, the dump truck illustrated includes a chassis 11 having an operator's cab 12 at its forward end and a dump body 13 located to the rear of and spaced from the cab 12. The body 13 is pivotally mounted, as at 14, to the chassis 11 to permit its being moved from its normal position, illustrated in Fig. 1, into a dumping position, as shown in Fig. 2. A normally latched, pivotally suspended, removable tail gate 15 constitutes the back end of the body 13, it being obvious that when the body is in the dumping position, shown in Fig. 2, the gate 15 may be released to permit discharge of material contained in the body. Movement of the body into its normal and dumping positions may be accomplished by actuation of fluid operated means indicated at 16. A fluid pressure tank 17 is carried by the chassis for the purpose of supplying fluid to the fluid operated means 16.

A pair of fabricated arms 18 is arranged with one on each side of the body 13. Each of these arms is pivotally secured at one end 19 to the body 13 and its free end extends beyond the back end of the body and is provided with a fork 21. The forks 21 are adapted to receive trunnions 22, one provided on each end wall of a lift or container 23. The lift 23, illustrated in Figs. 1, 2 and 3, is a shovel or scoop type of container and it includes a wall portion 24 pivoted at 20 and normally held in the full line position illustrated by latch means 131.

Figure 2:
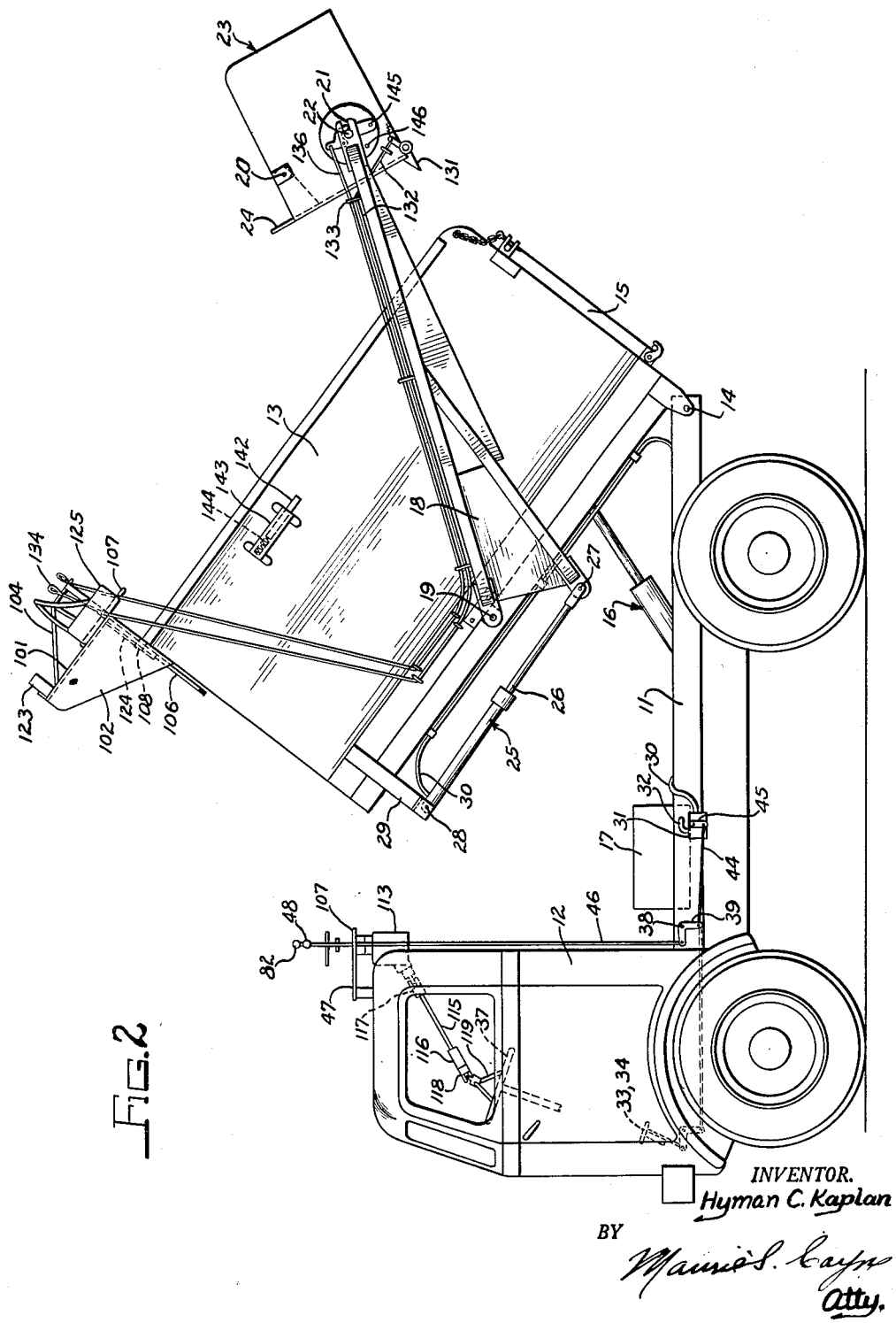
Fig. 2 is a side elevational view of said vehicle showing the body thereof in dumping position.

Means is provided to rotate the arms about their pivots 19 so as to elevate the container 23 from the full line position shown in Fig. 1 into the dotted line discharge position shown in said figure. When the container is in its discharge position, latch control means to be described hereinafter may be actuated to release the pivotally mounted wall 24 so that said wall may swing downwardly outwardly substantially into the dotted line position shown in Fig. 1, whereupon the contents of said container are discharged into the body 13.

The arms 18 are moved into material receiving and material discharging positions preferably by means of fluid operated extensible means 25, one of which is provided for each arm. As shown, this means includes a cylinder having a piston therein (not shown) which carries a rod 26 that extends out of one end of said cylinder and is connected at its end, as at 27, to the arm 18. The other end of the cylinder is pivotally secured, as at 28, to the lower end of a bracket 29 depending from the dump body 13. Common means is provided to admit fluid under pressure to each extensible means 25 through fluid line 30 from the fluid tank 17. To this end, a fluid control valve 31, with which the line 30 is connected, is firmly secured to the chassis 11. This valve is connected, as by a conduit 32, with the fluid tank 17 and it is adapted to be controlled manually in a manner to be described presently.

It should be quite evident at this time that when the self-loading vehicle is in use it is necessary to repeatedly raise and lower the lift 23 and to move the vehicle into various positions so as to engage the container with the material to be loaded. Conventional operation of the vehicle while it is being loaded is exceedingly difficult primarily because the operator must remain at least partly within the cab 12, thus obstructing his observation of the area in which the lift is operating. In order to overcome this difficulty, the operator may stand on the running board of the vehicle in an attempt to obtain a clear view of the area immediately to the rear of the vehicle. Obviously, this is most inconvenient, highly inefficient and dangerous. The present invention obviates the need for this type of operation by providing auxiliary vehicle and lift controls in such a position as will enable the operator to view the area rearwardly of the vehicle while seated on the top of the cab, from which position both the vehicle and lift means can be operated safely and with accuracy.

In order to accomplish this, novel means is provided above the roof of the cab for operating the conventional clutch pedal 33, brake pedal 34, accelerator pedal 35, transmission 36 and steering wheel 37. This means is perhaps best illustrated in Figs. 4, 5 and 8. Accordingly, a transverse shaft 38 extends between and is firmly secured at its ends in the side rails of the chassis 11 immediately to the rear of the cab 12. The shaft 38 carries a plurality of freely rotatable bell-cranks 39, 40, 41, 42 and 43.

One arm of the bell-crank 39, which is located on the outside of the chassis 11, is connected, as by a link 44, to the control lever 45 on the fluid control valve 31. The other arm of said bell-crank has a rod 46 extending upwardly along the outside face of the back wall of the cab 12 and through a guide plate 47 which is firmly mounted on and preferably spaced above the roof of said cab. The upper extremity of the rod 46 carries a knob 48, or the like, for convenient engagement whereby the rod 46 may be pulled upwardly or pushed downwardly to open and close the valve 31. This control linkage affords means whereby fluid under pressure may be admitted to or exhausted from the extensible members 25 for raising and lowering the lift arms 18.

One arm of the bell-crank 40 is connected by a link 51 to a bell-crank 52 loosely mounted upon a stud shaft 53 secured beneath the floor boards of the vehicle closely adjacent to the clutch and brake pedals 33 and 34. The other arm of the bell-crank 52 carries a pin 54 which extends through a slot 55 in a link 56, one end of which is pivotally secured, as at 57, to the brake pedal 34. The bell-crank 40, carried by shaft 38, has its other arm connected to one end of a rod 58 which extends upwardly along the back wall of the cab 12 and through the guide plate 47. The upper end of this rod has a foot-plate 59 thereon for a purpose to be described presently.

The bell-crank 41 on the shaft 38 has one of its arms connected to one end of a vertical rod 61 which also extends upwardly along the back wall of the cab 12 and through the guide plate 47. This rod also carries at its upper end a foot-plate 62 for a purpose to be described presently. The other arm of the bell-crank 41 is connected to one end of a link 63, the other end of which is connected, at 64, to one arm of a bell-crank 65 carried on the stud shaft 53. The other arm of said bell-crank 65 has a pin 66 which extends through and operates in a slot 67 in a link 68 pivotally connected, at 69, to the clutch pedal 33.

The bell-crank 42 on the shaft 38 has a rod 71 connected to one arm thereof, which rod also extends upwardly angularly and then through the guide plate 47 on the roof of the cab so as to dispose its free end portion 72 to the left of the auxiliary brake pedal or foot-plate 59, as viewed in Fig. 4, for a purpose to be described presently. The other arm of the bell-crank 42 has one end of a tie rod 73 connected thereto, the other end of which is connected to one arm of a bell-crank 74 freely mounted on a stud 75 fixedly mounted beneath the floor boards of the vehicle. The other arm of the bell-crank 74 preferably has one end of a flexible cable 76 connected thereto, the other end of which is firmly secured to the accelerator pedal 35. If desired, the connection between the cable 76 and the accelerator pedal 35 may be omitted and the cable 76 may be extended directly to and connected with the carburetor control.

It should be obvious that the auxiliary controls discussed hereinabove provide remote control means above the cab roof for operating the clutch, brake, accelerator and lift control valve.

Means also is provided whereby the conventional gear shift mechanism 36 may be actuated from a position above the roof of the cab. To this end, a rod 81 (Fig. 8) is connected at one of its ends to one arm of the bell-crank 43. This rod extends upwardly along the back wall of the cab, through the guide-plate 47, and terminates in a hand grip 82. The other arm of the bell-crank 43 has a link 83 connected thereto. The link 83 extends forwardly beneath the floor of the cab and it is connected at its forward end to the lower free end portion 84 of a lever 85 pivotally mounted intermediate its ends, as at 86, to the transmission housing. The lever extends upwardly beyond the pivot 86 and has its uppermost end portion 87 turned substantially at right angles toward the conventional gear shift lever 88. A fork 89 is provided in the end portion 87.

During normal operation of the vehicle from within the cab, at which time the gear shift lever is actuated in the conventional manner, the lever 85 is held in a forwardly tilted position by means of a spring 91. Upon referring to Fig. 8, it will be observed that one end of the spring 91 is connected to the uppermost end of the lever 85 and that its lower end is secured firmly to the horizontally disposed flange 92 of an angle plate 93. This angle plate is secured firmly to the side wall of the transmission housing. It will be noted further that the flange 92 of the angle plate 93 is slotted longitudinally, as at 94, to permit the lever 85 to be extended therethrough.

When it is desired to operate the transmission through operation of the auxiliary control 82 located on the roof of the cab, the lever 85 is moved into such position that, when the gear shift lever 88 is located in line for shifting into low and reverse speeds, said gear shift lever is engaged in the fork 89. Such engagement between the gear shift lever 88 and the fork 89 is maintained by a spring 95 which is connected at one end to the end portion 87 and at its other end to the gear shift lever 88.

To operate the gear shift through manipulation of the auxiliary control 82, the control 82 is pushed downwardly thus rocking its associated bell-crank 43 to cause the forked lever to rock about its pivot 86 in such direction as to carry its forked end 87 forwardly. This movement actuates the gear shift lever 88 in a manner to engage the reverse driving gears of the transmission. When the auxiliary control 82 is pulled upwardly, the lever 85 is rocked in a reverse direction to carry the gear shift lever 88 from its reverse gear driving position into low speed driving position. It has been found that the vehicle can be moved into the various positions necessary to facilitate loading of the lift 23 through the use of these two speeds only.

Certain conventional transmissions do not have a straight line path for the gear shift lever 88 to pass through while it is being moved from low speed position to reverse speed position or vice-versa. In such instances, it is necessary to rock the gear shift lever out of its straight line path upon reaching neutral before it can be moved into the other position. Accordingly, means is provided in the present auxiliary control for accommodating such a path of travel. This means is best illustrated in Figs. 8 and 9, in which it will be observed that a cam plate 96 is mounted upon the top flange of the angle plate 93. This cam plate has a cam surface 97 along which the lever 85 may ride when moving from one end to the other of the slot 94 in said angle plate. Inasmuch as this cam plate is not necessary to the operation of all types of transmissions, it is adjustably mounted. As shown, bolts 98 afford means for securing the cam plate to the angle plate 93. These bolts extend through longitudinal slots 99 in the cam plate and transverse slots 100 in the angle plate. It will thus be observed that the position of the cam plate may be easily and quickly adjusted by loosening the bolts 98 and shifting said plate into a desired position, whereupon said bolts may be again tightened to retain it in place.

In order to provide accommodations for the operator and means to steer the vehicle above the roof of the cab 12, the front wall of the body 13 is provided, on its upper edge, with a forwardly extending floor 101. This floor is spaced above the cab plate 47 and is provided with suitable depending end flanges 102 to insure its rigidity. A substantially rectangular opening 103 is formed in the floor plate 101, through which the auxiliary control rods 46, 58, 61, 71 and 81 extend. A frame structure, indicated at 104, is firmly mounted on and extends upwardly from the floor plate 101. This frame structure includes a hole 105 through which an auxiliary steering column 106 may be extended.

The steering column 106 has a steering wheel 107 on its upper end and it is provided with a collar 108 to limit its insertion through the hole 105. The lower end of the steering column 106 extends beneath the plate 47 and is formed with a squared portion 109 at its end which is telescopically received in the hub 111 of a bevel gear 112. The gear 112 is enclosed within a gear box 113 mounted on the back wall of the cab adjacent its roof. A companion bevel gear 114 also is enclosed within the box and is meshed constantly with the bevel gear 112. The gear 114 is secured firmly on one end of a shaft 115, the other end of which is splined to telescopically receive a sleeve 116. A universal joint 117 is provided in the shaft 115 for a purpose to be described presently. The free end of the sleeve 116 carries one element of a universal joint 118, the other element of which constitutes a hub for a plurality of fingers 119 which radiates angularly therefrom. The fingers 119 are formed on their ends to disengageably engage the spokes of the conventional steering wheel 37 of the motor vehicle.

The construction of the auxiliary steering mechanism is such that when it is desired to disengage the auxiliary steering mechanism from the steering wheel 37, the fingers 119 are disengaged from the steering wheel by sliding the sleeve 116 over the shaft 115. The shaft 115, with its steering wheel-engaging fingers 119 may then be swung back against the back wall of the cab and engaged with a bracket 122 provided therefor.

The floor plate 101 has a boss 123 thereon which provides a socket to telescopically receive the post 124 of a seat 125. It will be observed that the seat 125 is in alignment with the auxiliary steering wheel 107 and that the seat faces to the rear of the vehicle. This affords means whereby the operator has a full view of the area in the immediate vicinity of the rear of the self-loading vehicle and that he has within range, in the same manner as is present within the vehicle cab, the various controls for controlling the operation of the vehicle and lift. The positions of the auxiliary controls relative to the seat 125 and auxiliary steering wheel 107 are identical with the positions of the vehicle controls with respect to the vehicle steering wheel. Consequently, an operator seated on the seat 125 may operate the vehicle with confidence because of the conventional location of the controls.

When the auxiliary controls are not in use, the seat 125 may be disengaged from the mounting boss 123 and its post 124 may be inserted through a hole 126 provided in the floor plate 101. Likewise, the auxiliary steering wheel 107 and its shaft 106 may be withdrawn from their operative positions in engagement with bevel gear 112 and may be inserted through a hole 127 in the floor plate 101. In this manner, both the seat and steering wheel are securely retained in a readily accessible position without being unduly exposed as would occur were they permitted to remain in their usable positions.

As has been noted hereinabove, means is provided on the top of the vehicle cab for controlling the dumping position of the lift or container 23. Accordingly, any conventional latch means, generally indicated at 131, may be provided to normally hold the movable container wall 24 in container closing position. When the container is lifted into the broken line position, illustrated for example in Fig. 1, the retaining means is actuated to release the wall 24 whereupon the contents thereof are discharged into the truck body. This means may consist of a cable 132 suitably strung through eyelets 133 or otherwise guided along the one of the lift arms 18 and terminating in a manually engageable ring 134, or the like, above the frame 104. Similarly, a second cable 136 is mounted for easy engagement by the operator seated on top of the vehicle for releasing a latch 137 associated with the forked end of one of the lift arms 18. This latch securely retains the lift container 23 in place on the lift arm but, when the latch is released and the vehicle moved forwardly, the lift container 23 is disengaged therefrom. Thereafter, said container or another previously loaded container may be engaged for subsequent lifting and dumping into the truck body.

As an example of a modified version of the container, Fig. 10 illustrates a substantially rectangular open top container having trunnions 138 on its ends disposed for engagement with the forked ends of the arms 18. The container illustrated in Fig. 10 preferably is provided with wheels 139 and casters 141 so as to facilitate its movement when separated from the self-loading vehicle. Obviously, the lift containers may incorporate a bottom structure similar to that of platform skids which also are readily movable into various positions.

Upon referring to Fig. 1, it will be noted that when the lift arms 18 are raised beyond a substantially vertical position, at least one arm will strike a yieldable plunger 142 telescopically mounted in a housing 143 firmly secured to the side wall of the vehicle body. A spring 144 normally tends to urge the plunger 142 outwardly. Consequently, when the fluid pressure within the extensible means 25 is relieved, the plunger 142 will urge the arms 118 into and rearwardly beyond the vertical, whereupon said arms with the container will fall by gravity into their lowermost positions. If desired, a pin 145 (Fig. 1) may be engaged in one of a plurality of holes 146 arranged in a circle about a trunnion 22 to hold the container in a predetermined position relative to the arms 18.

Although an exemplary form of the present invention has been specifically disclosed in the accompanying drawings and described in detail in the foregoing specification, it should be understood that the invention may embody a wide variety of modifications in its detail structure, and particularly in the manner and means for carrying auxiliary control means above the plane of the roof of a vehicle cab so as to permit remote control of the vehicle and lift means, without departing from the spirit of the invention or the scope of the appended claims.

I claim:

1. A power-operated vehicle comprising a chassis and an operator's cab on said chassis, a body on said chassis spaced rearwardly of the cab, a pair of arms pivotally secured to said body extending beyond the rear end thereof, a lift carried on the extending ends of said arms, power means to move the arms about their pivots so as to position the lift in material receiving and material discharging positions, control means for said arm moving power means arranged above the roof of the cab, vehicle control means located above the cab roof, all of said control means extending through the space between the cab and body, and a seat supported on a platform above the plane of the cab roof forwardly of the controls.

2. A power-operated vehicle comprising a chassis and an operator's cab on said chassis, a body on said chassis spaced rearwardly of the cab, a pair of arms pivotally secured to said body extending beyond the rear end thereof, a lift carried on the extending ends of said arms, power means to move the arms about their pivots so as to position the lift in material receiving and material discharging positions, control means for said arm moving power means arranged above the roof of the cab, vehicle control means located above the cab roof, all of said control means extending through the space between the cab and body, and a seat above the plane of the cab roof forwardly of the controls, said seat being mounted on and movable with the body.

3. A power-operated vehicle comprising a chassis and an operator's cab on said chassis, a body on said chassis spaced rearwardly of the cam, a pair of arms pivotally secured to said body extending beyond the rear end thereof, a lift carried on the extended ends of said arms, power means to move the arms about their pivots so as to position the lift in material receiving and material discharging positions, control means for said arm moving power means arranged above the roof of the cab, vehicle control means located above the cab roof, all of said control means extending through the space between the cab and body, and a platform on the body overhanging the roof of the cab, said platform having an opening therein through which the controls extend.

4. In a power operated vehicle having a cab and a body, in combination, a power operated lift mounted on and located at the rear of said body, a platform on the forward end of said body, said platform overlying the roof of the cab, a seat on said platform, a plurality of manually actuable extensions for the vehicle controls and for the lift control extending upwardly rearwardly of the back wall of the cab, said controls being located for ready engagement and manipulation by an operator seated upon said seat, and an extension for the vehicle steering mechanism including an auxiliary steering wheel located for operation by an operator seated on said seat.

5. A vehicle including a cab having a roof, lift means secured to said vehicle, means for controlling the actuation of said lift means positioned on the roof, a foldable shaft extending through a wall of said cab, connecting means on said shaft for engagement with the vehicle steering wheel, means on said roof for actuating the gear shift lever of the vehicle, means on said roof for actuating the vehicle brake pedal, means on said roof for actuating the vehicle clutch pedal, and means on said roof for actuating the vehicle accelerator means.

6. A vehicle including a cab having a roof, lift means secured to said vehicle, means for controlling the actuation of said lift means positioned on the roof of said vehicle, a foldable shaft extending into the cab, slidable connecting means on said shaft for engagement with the vehicle steering wheel, means on said roof for actuating the gear shift lever of the vehicle, and means for selectively retaining the foldable shaft in folded position.

7. In a truck including a body, a cab, a gear shift lever, a steering wheel, brake, clutch and throttle control pedals in said cab, a container and arms pivotally mounting said container on said body, control mechanisms mounted on said cab and accessible above the roof of said cab comprising, an extension steering column formed of detachably connected sections and means pivotally carried by one of the sections and foldable into an out of the way position connecting the steering wheel with said column, an auxiliary gear shift control mounted on said cab, and means actuated by said auxiliary control for transmitting movement to said gear shift lever, means on said cab for actuating said pedals, and a control mounted on said cab for operating the container arms.

8. A power-operated vehicle comprising a chassis and an operator's cab on said chassis, a body on said chassis spaced rearwardly of the cab, a pair of pivotally mounted arms extending beyond the rear end of the body, a lift carried on the extending ends of said arms, power means to move the arms about their pivots so as to position the lift in material receiving and material discharging positions, control means for said arm moving power means arranged above the roof of the cab, vehicle control means located above the cab roof, all of said control means extending through the space between the cab and body, and a seat above the plane of the cab roof forwardly of the controls, said seat being mounted on and movable with the body.

HYMAN C. KAPLAN.

REFERENCES CITED

The following references are of record in the file of this patent:

UNITED STATES PATENTS

| Number | Name | Date |
| --- | --- | --- |
| 1,096,656 | Whitney | May 12, 1914 |
| 1,430,655 | Irrgang | Oct. 3, 1922 |
| 1,548,964 | Vollmer | Aug. 11, 1925 |
| 2,056,495 | Venema | Oct. 6, 1936 |
| 2,261,483 | Nickles | Nov. 4, 1941 |
| 2,325,731 | Arentzen et al. | Aug. 3, 1943 |
| 2,422,813 | Walch | June 24, 1947 |
| 2,450,152 | Miller | Sept. 28, 1948 |
| 2,453,943 | Smith | Nov. 16, 1948 |
| 2,529,192 | Rossner | Nov. 7, 1950 |
| 2,572,029 | Huston | Oct. 23, 1951 |

FOREIGN PATENTS

| Number | Country | Date |
| --- | --- | --- |
| 346,464 | Great Britain | Apr. 16, 1931 |